US012659467B2

(12) United States Patent (10) Patent No.: US 12,659,467 B2
Tsai et al. (45) Date of Patent: Jun. 16, 2026

(54) METHOD AND APPARATUS OF IMPROVEMENT FOR DECODER-DERIVED INTRA PREDICTION IN VIDEO CODING SYSTEM

(71) Applicant: MEDIATEK INC., Hsinchu City (TW)

(72) Inventors: Chia-Ming Tsai, Hsinchu City (TW); Chun-Chia Chen, Hsinchu City (TW); Man-Shu Chiang, Hsinchu City (TW); Yu-Cheng Lin, Hsinchu City (TW); Tzu-Der Chuang, Hsinchu City (TW); Chih-Wei Hsu, Hsinchu City (TW); Ching-Yeh Chen, Hsinchu City (TW); Yu-Wen Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/856,228

(22) PCT Filed: Apr. 12, 2023

(86) PCT No.: PCT/CN2023/087852
§ 371 (c)(1),
(2) Date: Oct. 11, 2024

(87) PCT Pub. No.: WO2023/198112
PCT Pub. Date: Oct. 19, 2023

(65) Prior Publication Data
US 2025/0254292 A1 Aug. 7, 2025
Related U.S. Application Data

(60) Provisional application No. 63/331,347, filed on Apr. 15, 2022.

(51) Int. Cl.
H04N 7/12 (2006.01)
H04N 19/11 (2014.01)
(Continued)

(52) U.S. Cl.
CPC ........... H04N 19/11 (2014.11); H04N 19/176 (2014.11); H04N 19/80 (2014.11)

(58) Field of Classification Search
CPC ...................................................... H04N 19/11
See application file for complete search history.

(56) References Cited

U.S. PATENT DOCUMENTS 10,939,096 B2 3/2021 Xiu
11,044,469 B2 6/2021 Kotra
(Continued)

FOREIGN PATENT DOCUMENTS

CN 109417625 A 3/2019
CN 110199520 A 9/2019
(Continued)

OTHER PUBLICATIONS

International Search Report and Written Opinion dated Jun. 30, 2023, issued in application No. PCT/CN2023/087852.
(Continued)

*Primary Examiner* — Y Lee
(74) *Attorney, Agent, or Firm* — McClure, Qualey & Rodack, LLP

(57) ABSTRACT

Methods and apparatus for video coding are disclosed. According to one method, a selected set of angular intra prediction candidate modes corresponding to a subset of an initial set of angular intra prediction modes is used to derive DIMD candidates. In another method, a delta angle between the final intra prediction mode and a DIMD derived mode is signalled or parsed. In yet another method, a DIMD candidate mode is determined by using a process including comparing gradient magnitudes of the gradient filtered results with a threshold.

13 Claims, 12 Drawing Sheets

(51) Int. Cl.
   H04N 19/176      (2014.01)
   H04N 19/80       (2014.01)

(56)                    References Cited

U.S. PATENT DOCUMENTS

| | | | |
|---|---|---|---|
| 11,240,524 B2 | 2/2022 | Chen | |
| 11,290,736 B1 | 3/2022 | Wang | |
| 11,665,337 B2 | 5/2023 | Moon | |
| 12,531,985 B2 * | 1/2026 | Paluri | .................. H04N 19/107 |
| 2017/0353730 A1 | 12/2017 | Liu | |
| 2019/0379891 A1 | 12/2019 | Moon | |
| 2025/0379987 A1 * | 12/2025 | Wang | ................... H04N 19/159 |
| 2025/0386019 A1 * | 12/2025 | Chen | ...................... H04N 19/11 |
| 2025/0386032 A1 * | 12/2025 | Yoon | ................... H04N 19/159 |

FOREIGN PATENT DOCUMENTS

| | | | |
|---|---|---|---|
| CN | 112385227 A | 2/2021 | |
| TW | 202127890 A | 7/2021 | |

OTHER PUBLICATIONS

Abdoli, M., et al.; "CE3-related: Improvements on the Decoder-side Intra Mode Derivation;" Joint Video Experts Team (JVET) of ITU-T SG 16 WP 3 and ISO/IECJTC 1/SC 29/WG 11; Jan. 2019; pp. 1-4.

Mora, E., et al.; "CE3: Decoder-side Intra Mode Derivation (tests 3.1.1, 3.1.2, 3.1.3 and 3.1.4);"Team (JVET) of ITU-T SG 16 WP 3 and ISO/IEC JTC 1/SC 29/WG 11; Jan. 2019; pp. 1-7.

Chinese language office action dated Aug. 6, 2024, issued in application No. TW 112113834.

* cited by examiner

SPLIT_BT_VER          SPLIT_BT_HOR          SPLIT_TT_VER          SPLIT_TT_HOR

1130

1140

METHOD AND APPARATUS OF IMPROVEMENT FOR DECODER-DERIVED INTRA PREDICTION IN VIDEO CODING SYSTEM

CROSS REFERENCE TO RELATED APPLICATIONS

The present invention is a non-Provisional Application of and claims priority to U.S. Provisional Patent Application No. 63/331,347, filed on Apr. 15, 2022. The U.S. Provisional Patent Application is hereby incorporated by reference in its entirety.

FIELD OF THE INVENTION

The present invention relates to intra prediction in a video coding system. In particular, the present invention relates to computational complexity reduction and/or performance improvement of Decoder Side Intra Mode Derivation (DIMD) coding tool.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology-Coded representation of immersive media-Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

In the present invention technique to improve the performance or to reduce the computational complexity for Decoder-side Intra Mode Derivation (DIMD) coding tool is disclosed.

BRIEF SUMMARY OF THE INVENTION

A method and apparatus for video coding are disclosed. According to the method, pixel data associated with a current block at an encoder side or coded data associated with the current block to be decoded at a decoder side are received. A selected set of angular intra prediction candidate modes corresponding to a subset of an initial set of angular intra prediction modes is determined for the current block, wherein the selected set of angular intra prediction candidate modes is dependent on a block size of the current block or a prediction mode of a neighbouring block of the current block. One or more target DIMD (Decoder Side Intra Mode Derivation) candidates are determined from the selected set of angular intra prediction candidate modes for the current block based on a DIMD process using statistics or histogram of angle field derived from a template of the current block. A final intra predictor is generates based on information comprising said one or more target DIMD candidates. The current block is encoded or decoded using the final intra predictor.

In one embodiment, a number of angular intra prediction candidate modes in the selected set of angular intra prediction candidate modes is determined to be lesser for a smaller block size of the current block. The block size of the current block may correspond to a sum of block width and block height of the current block.

In one embodiment, the selected set of angular intra prediction candidate modes corresponds to a predefined set of angular intra prediction modes for the current block.

In one embodiment, the selected set of angular intra prediction candidate modes corresponds to a constrained candidate set. The constrained candidate set may correspond to a member in a group comprising even-numbered intra prediction modes, odd-numbered intra prediction modes, first-half set of the initial set of angular intra prediction modes, or last-half set of the initial set of angular intra prediction modes. In one embodiment, a syntax is signalled or parsed to indicate the member in the group corresponding to the constrained candidate set for the current block. In another embodiment, a syntax related to the constrained candidate set is signalled or parsed from PPS (Picture Parameter Set), SPS (Sequence Parameter Set), a picture header, a slice header, or a CTU-level syntax.

In one embodiment, a syntax related to the constrained candidate set is implicitly derived based on other syntax. In another embodiment, the constrained candidate set is always used.

In one embodiment, if a top neighbouring CU is inter-coded in skip mode, the selected set of angular intra prediction candidate modes excludes angular intra prediction candidate modes with mode numbers greater than a diagonal intra angular mode. In another embodiment, if a left neighbouring CU is inter-coded in skip mode, the selected set of angular intra prediction candidate modes excludes angular intra prediction candidate modes with mode numbers less than a diagonal intra angular mode.

According to another embodiment, an initial intra prediction mode derived using DIMD (Decoder Side Intra Mode Derivation). One or more syntaxes associated with a delta angle are signalled in the bitstream or parsing from the bitstream. The current block is encoded or decoded using a final intra prediction mode, wherein the delta angle corresponds to a difference between the final intra prediction mode and the initial intra prediction mode.

In one embodiment, said one or more syntaxes comprise a first syntax associated with a magnitude of the delta angle and a second syntax associated with a sign of the delta angle.

According to another embodiment, one or more gradient filters are applied to a template of the current block to generate gradient filtered results. A DIMD candidate mode is determined by comparing gradient magnitudes of the gradient filtered results with a threshold. A final intra predictor is generated based on information comprising the DIMD candidate mode. The current block is encoded or decoded using the final intra predictor.

In one embodiment, the threshold is dependent on a block size of the current block. In one embodiment, if all of the gradient magnitudes are smaller than the threshold, the DIMD candidate mode is set to planar mode. In another embodiment, a target candidate intra angular mode having a greatest gradient magnitude in DIMD is set to a current intra prediction mode.

DETAILED DESCRIPTION OF THE INVENTION

Figure 1A:
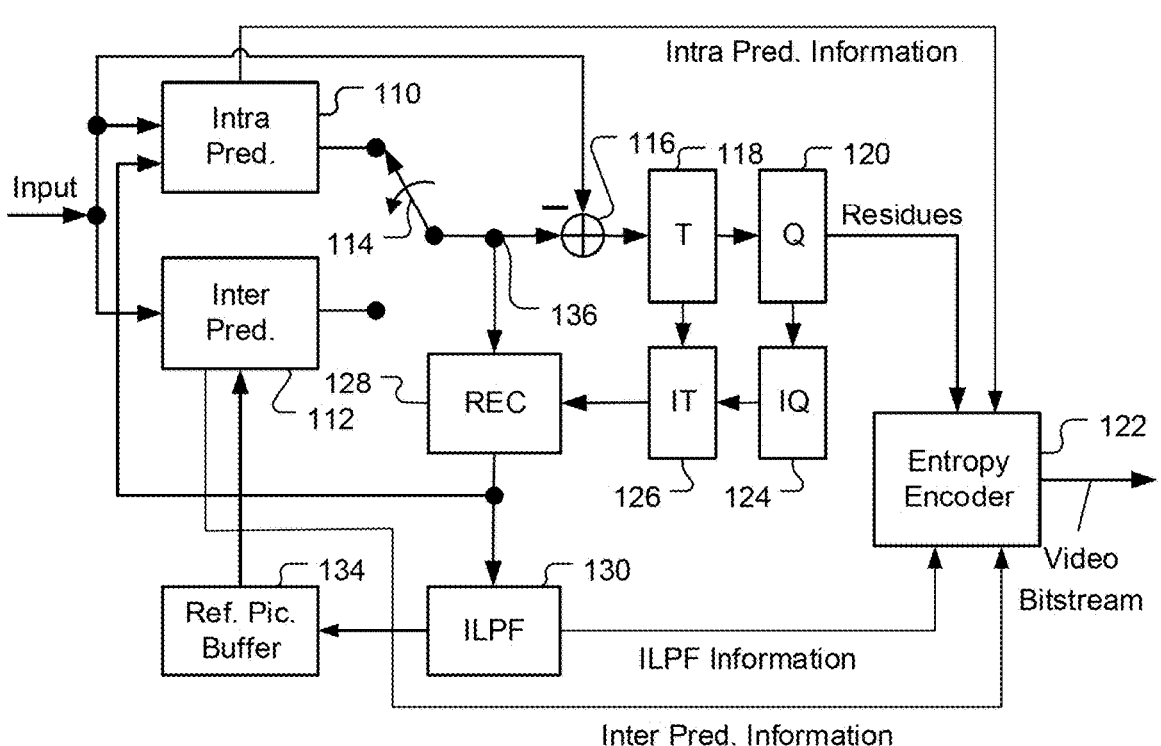
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Among various new coding tools, some coding tools relevant to the present invention are reviewed as follows.

Partitioning of the CTUs Using a Tree Structure

In HEVC, a CTU is split into CUs by using a quaternary-tree (QT) structure denoted as coding tree to adapt to various local characteristics. The decision whether to code a picture area using inter-picture (temporal) or intra-picture (spatial) prediction is made at the leaf CU level. Each leaf CU can be further split into one, two or four Pus according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

Figure 2:
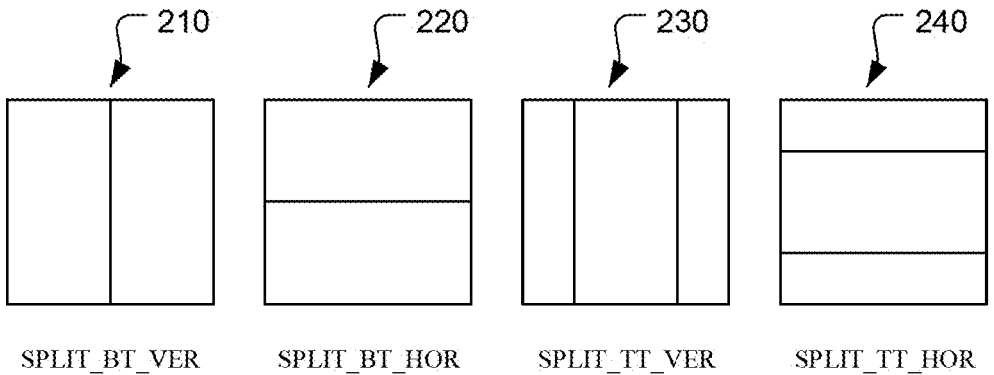
FIG. 2 illustrates examples of a multi-type tree structure corresponding to vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR).

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 2, there are four splitting types in multi-type tree structure, vertical binary splitting (SPLIT_BT_VER 210), horizontal binary splitting (SPLIT_BT_HOR 220), vertical ternary splitting (SPLIT_TT_VER 230), and horizontal ternary splitting (SPLIT_TT_HOR 240). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

Figure 3:
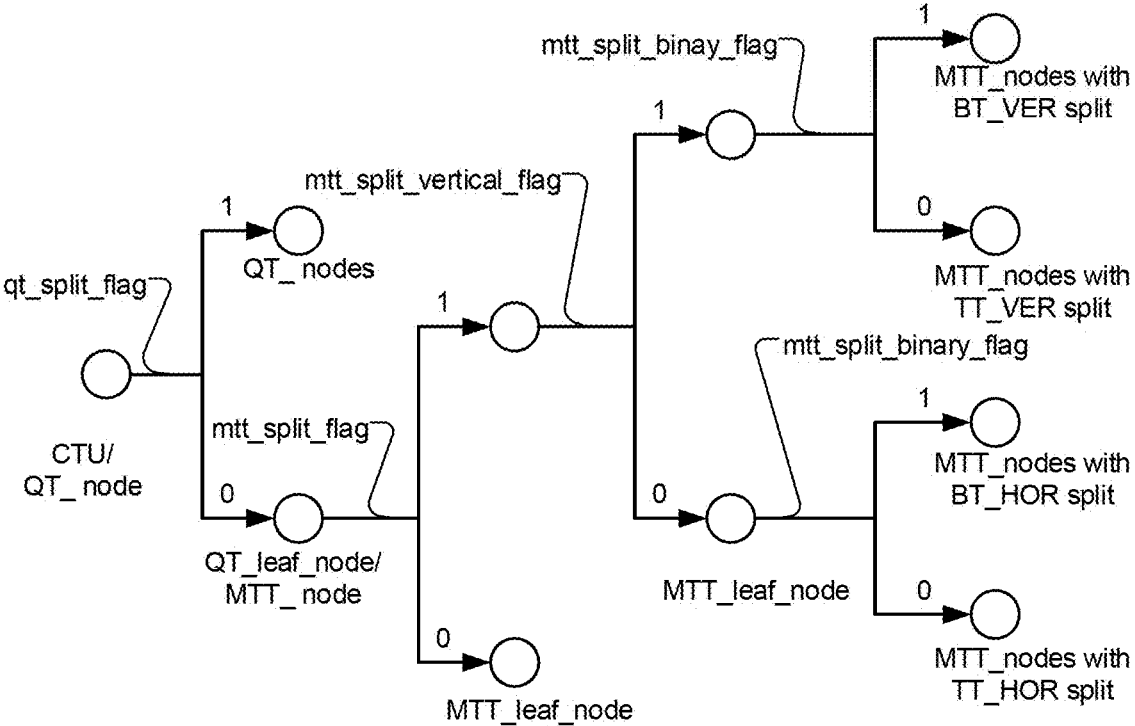
FIG. 3 illustrates an example of the signalling mechanism of the partition splitting information in quadtree with nested multi-type tree coding tree structure.

FIG. 3 illustrates the signalling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 1.

TABLE 1

| MttSplitMode derviation based on multi-type tree syntax elements | | |
|---|---|---|
| MttSplitMode | mtt_split_cu_vertical_flag | mtt_split_cu_binary_flag |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 4:
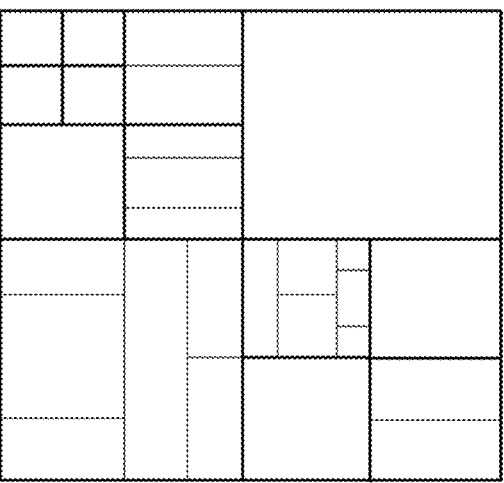
FIG. 4 shows an example of a CTU divided into multiple CUs with a quadtree and nested multi-type tree coding block structure, where the bold block edges represent quadtree partitioning and the remaining edges represent multi-type tree partitioning.

FIG. 4 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum size chroma CB consist of 16 chroma samples.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined and specified by SPS syntax elements for the quadtree with nested multi-type tree coding tree scheme.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size

MaxMttDepth: the maximum allowed hierarchy depth of multi-type tree splitting from a quadtree leaf MinBtSize: the minimum allowed binary tree leaf node size MinTtSize: the minimum allowed ternary tree leaf node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinBtSize and MinTtSize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node could be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinBtSize and smaller or equal to 2*MinTtSize, no further horizontal splitting is considered. Similarly, when the multi-type tree node has height equal to MinBtSize and smaller or equal to 2*MinTtSize, no further vertical splitting is considered.

Figure 5:
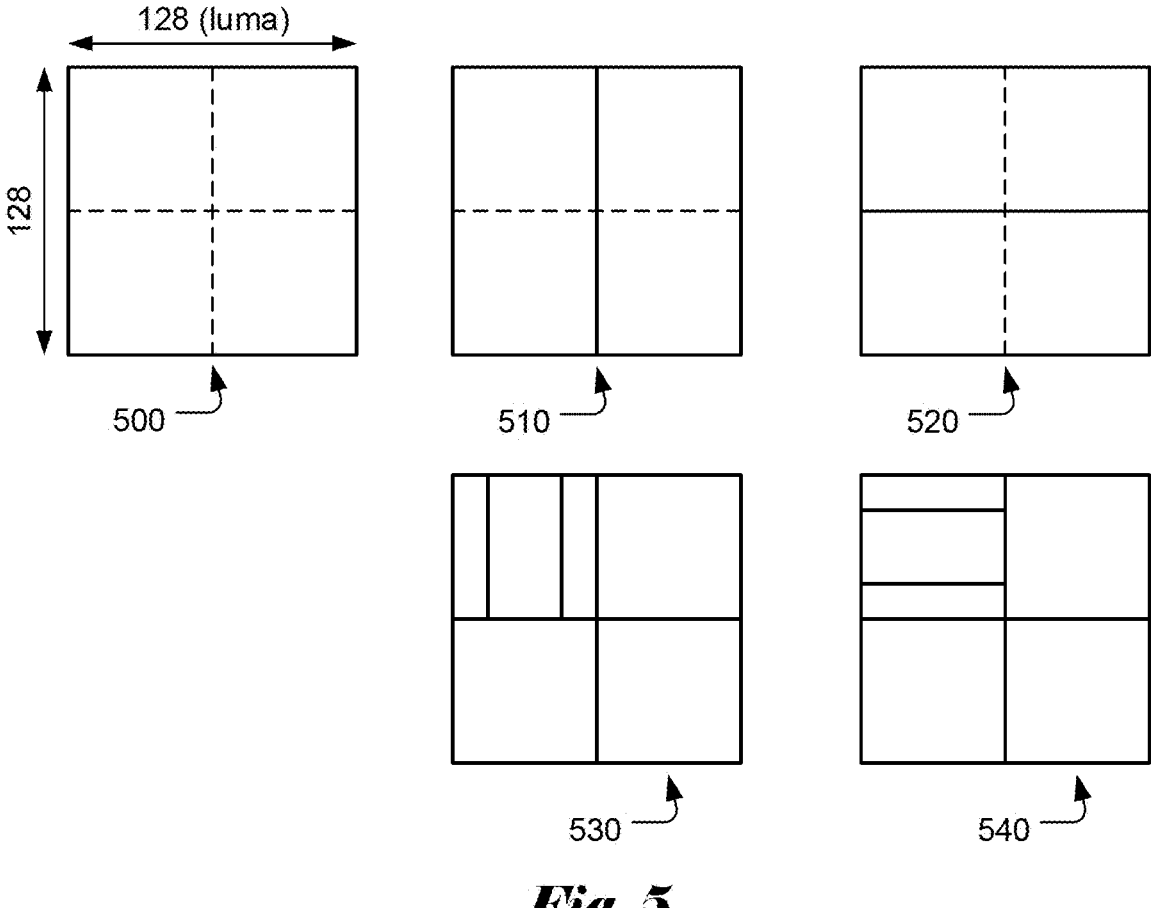
FIG. 5 shows an example of TT split forbidden when either width or height of a luma coding block is larger than 64.

To allow 64×64 Luma block and 32×32 Chroma pipelining design in VVC hardware decoders, TT split is forbidden when either width or height of a luma coding block is larger than 64, as shown in FIG. 5, where block 500 corresponds to a 128×128 luma CU. The CU can be split using vertical binary partition (510) or horizontal binary partition (520). After the block is split into 4 CUs, each size is 64×64, the CU can be further partitioned using partitions including TT. For example, the upper-left 64×64 CU is partitioned using vertical ternary splitting (530) or horizontal ternary splitting (540). TT split is also forbidden when either width or height of a chroma coding block is larger than 32.

In VVC, the coding tree scheme supports the ability for the luma and chroma to have a separate block tree structure. For P and B slices, the luma and chroma CTBs in one CTU have to share the same coding tree structure. However, for I slices, the luma and chroma can have separate block tree structures. When the separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

Virtual Pipeline Data Units (VPDUs)

Virtual pipeline data units (VPDUs) are defined as non-overlapping units in a picture. In hardware decoders, successive VPDUs are processed by multiple pipeline stages at the same time.

The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

Figure 6:
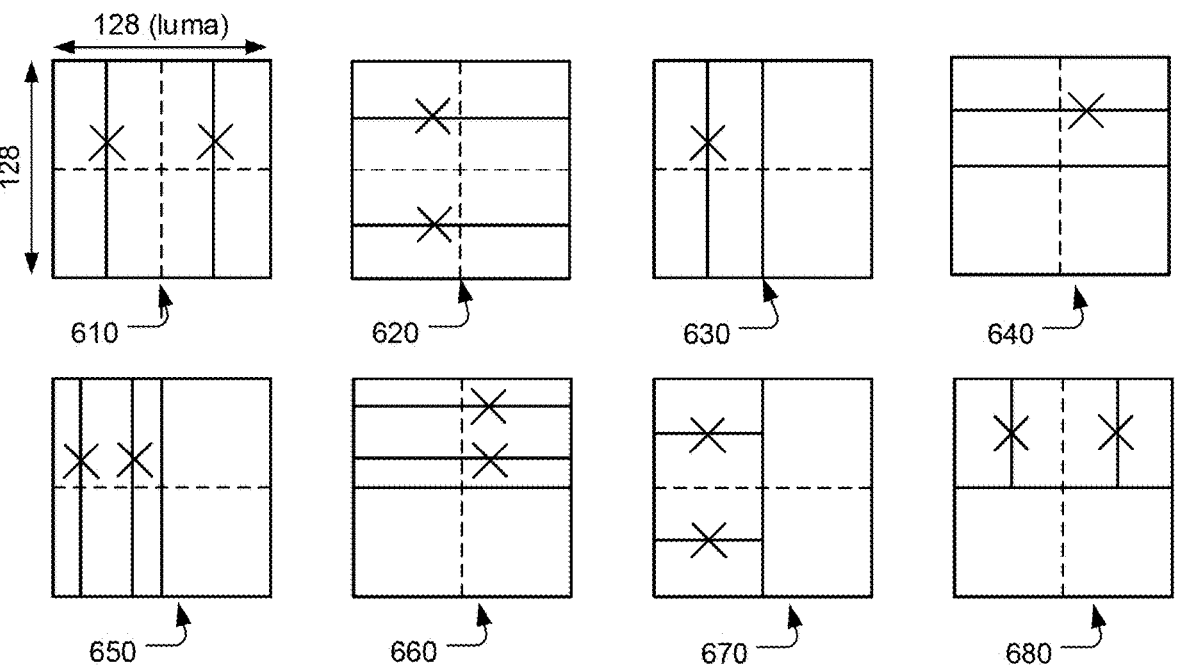
FIG. 6 shows some examples of TT split forbidden when either width or height of a luma coding block is larger than 64.

In order to keep the VPDU size as 64×64 luma samples, the following normative partition restrictions (with syntax signalling modification) are applied in VTM, as shown in FIG. 6:

TT split is not allowed (as indicated by "X" in FIG. 6) for a CU with either width or height, or both width and height equal to 128.

For a 128×N CU with N≤64 (i.e. width equal to 128 and height smaller than 128), horizontal BT is not allowed.

For an N×128 CU with N≤64 (i.e. height equal to 128 and width smaller than 128), vertical BT is not allowed. In FIG. 6, the luma block size is 128×128. The dashed lines indicate block size 64×64. According to the constraints mentioned above, examples of the partitions not allowed are indicated by "X" as shown in various examples (610-680) in FIG. 6.

Intra Mode Coding with 67 Intra Prediction Modes

Figure 7:
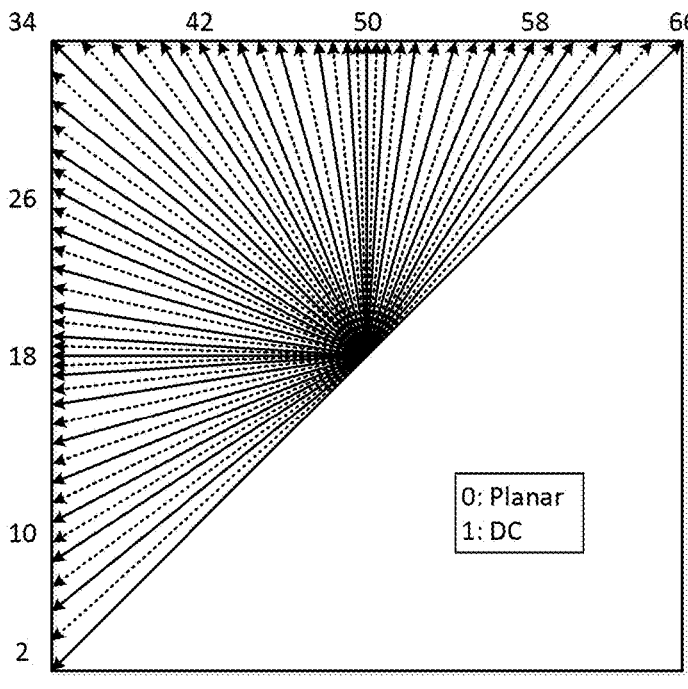
FIG. 7 shows the intra prediction modes as adopted by the VVC video coding standard.

To capture the arbitrary edge directions presented in natural video, the number of directional intra modes in VVC is extended from 33, as used in HEVC, to 65. The new directional modes not in HEVC are depicted as dotted arrows in FIG. 7, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighbouring intra modes. The following three aspects are considered to construct the MPM list:

Default intra modes

Neighbouring intra modes

Derived intra modes.

A unified 6-MPM list is used for intra blocks irrespective of whether MRL and ISP coding tools are applied or not. The MPM list is constructed based on intra modes of the left and above neighbouring block. Suppose the mode of the left is denoted as Left and the mode of the above block is denoted as Above, the unified MPM list is constructed as follows:

When a neighbouring block is not available, its intra mode is set to Planar by default.

If both modes Left and Above are non-angular modes:
MPM list→{Planar, DC, V, H, V−4, V+4}

If one of modes Left and Above is angular mode, and the other is non-angular:
Set a mode Max as the larger mode in Left and Above
MPM list→{Planar, Max, DC, Max−1, Max+1, Max−2}

If Left and Above are both angular and they are different:
Set a mode Max as the larger mode in Left and Above
if the difference of mode Left and Above is in the range of 2 to 62, inclusive
MPM list→{Planar, Left, Above, DC, Max−1, Max+1} Otherwise
MPM list→{Planar, Left, Above, DC, Max−2, Max+2}

If Left and Above are both angular and they are the same:
MPM list→{Planar, Left, Left−1, Left+1, DC, Left−2}

Besides, the first bin of the MPM index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 8A:
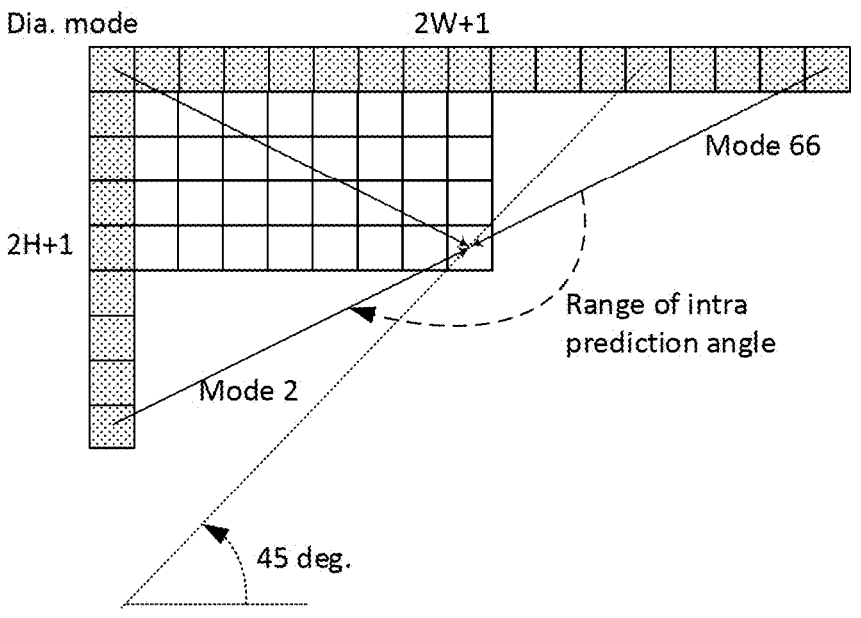
FIGS. 8A-B illustrate examples of wide-angle intra prediction a block with width larger than height (FIG. 8A) and a block with height larger than width (FIG. 8B).
Figure 8B:
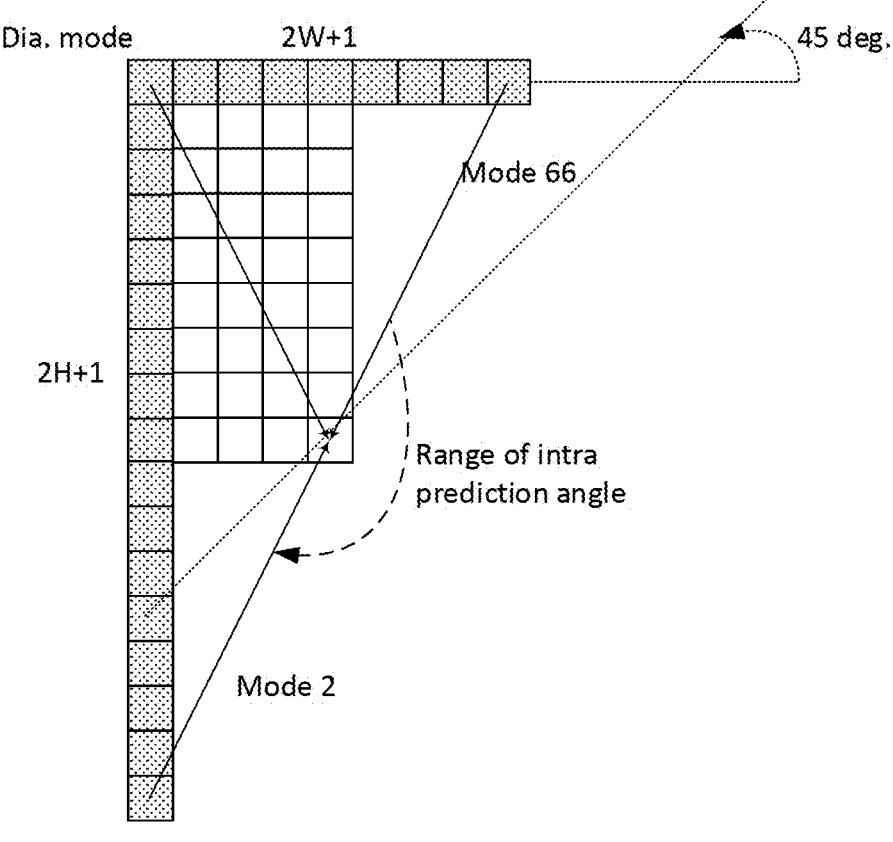

To support these prediction directions, the top reference with length 2W+1, and the left reference with length 2H+1, are defined as shown in FIG. 8A and FIG. 8B respectively.

The number of replaced modes in wide-angular direction mode depends on the aspect ratio of a block. The replaced intra prediction modes are illustrated in Table 2.

TABLE 2

| Intra prediction modes replaced by wide-angular modes | |
|---|---|
| Aspect ratio | Replaced intra prediction modes |
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| W/H = 2 | Modes 2, 3, 4, 5, 6, 7, |
| W/H = 1 | None |
| W/H = 1/2 | Modes 61, 62, 63, 64, 65, 66 |
| W/H = 1/4 | Mode 57, 58, 59, 60, 61, 62, 63, 64, 65, 66 |
| W/H = 1/8 | Modes 55, 56 |
| W/H = 1/16 | Modes 53, 54, 55, 56 |

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135° and above 45°, luma intra prediction modes ranging from 2 to 5 are mapped to 2. Therefore, chroma DM derivation table for 4:2:2 chroma format is updated by replacing some values of the entries of the mapping table to convert prediction angle more precisely for chroma blocks.

Decoder Side Intra Mode Derivation (DIMD)

When DIMD is applied, two intra modes are derived from the reconstructed neighbour samples, and those two predictors are combined with the planar mode predictor with the weights derived from the gradients. The DIMD mode is used as an alternative prediction mode and is always checked in the high-complexity RDO mode.

To implicitly derive the intra prediction modes of a blocks, a texture gradient analysis is performed at both the encoder and decoder sides. This process starts with an empty Histogram of Gradient (HoG) with 65 entries, corresponding to the 65 angular modes. Amplitudes of these entries are determined during the texture gradient analysis.

In the first step, DIMD picks a template of T=3 columns and lines from respectively left side and above side of the current block. This area is used as the reference for the gradient based intra prediction modes derivation.

In the second step, the horizontal and vertical Sobel filters are applied on all 3×3 window positions, centered on the pixels of the middle line of the template. At each window position, Sobel filters calculate the intensity of pure horizontal and vertical directions as $G_x$ and $G_y$, respectively. Then, the texture angle of the window is calculated as:

$$\text{angle} = \arctan(G_x / G_y), \tag{1}$$

which can be converted into one of 65 angular intra prediction modes. Once the intra prediction mode index of current window is derived as idx, the amplitude of its entry in the HoG[idx] is updated by addition of:

$$ampl = |G_x| + |G_y| \tag{2}$$

Figure 9A:
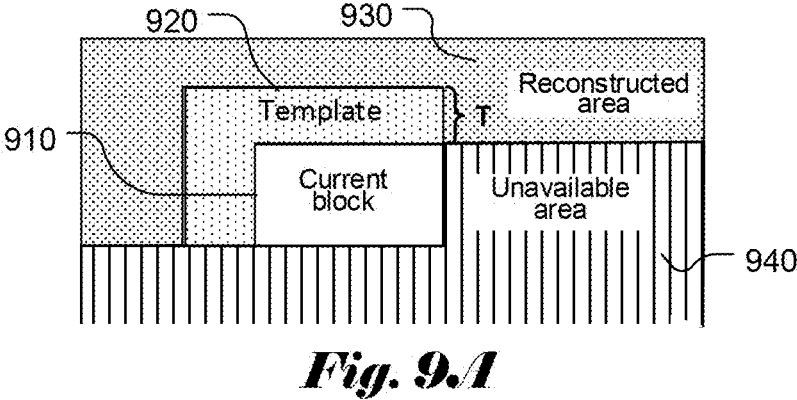
FIG. 9A illustrates an example of selected template for a current block, where the template comprises T lines above the current block and T columns to the left of the current block.
Figure 9B:
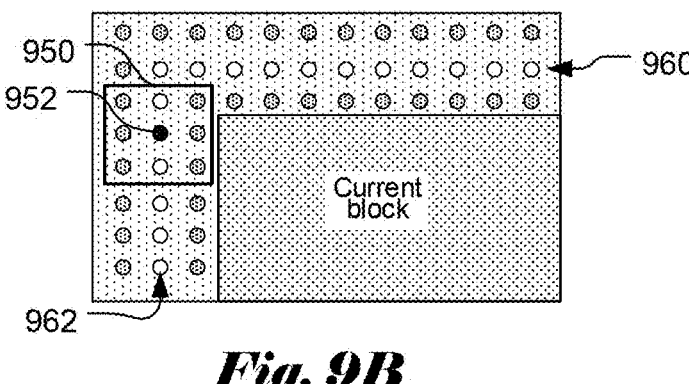
FIG. 9B illustrates an example for T=3 and the HoGs (Histogram of Gradient) are calculated for pixels in the middle line and pixels in the middle column.
Figure 9C:
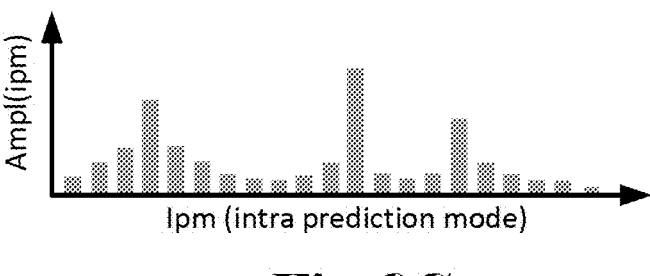
FIG. 9C illustrates an example of the amplitudes (ampl) for the angular intra prediction modes.

FIGS. 9A-C show an example of HoG, calculated after applying the above operations on all pixel positions in the template. FIG. 9A illustrates an example of selected template 920 for a current block 910. Template 920 comprises T lines above the current block and T columns to the left of the current block. For intra prediction of the current block, the area 930 at the above and left of the current block corresponds to a reconstructed area and the area 940 below and at the right of the block corresponds to an unavailable area. FIG. 9B illustrates an example for T=3 and the HoGs are calculated for pixels 960 in the middle line and pixels 962 in the middle column. For example, for pixel 952, a 3×3 window 950 is used. FIG. 9C illustrates an example of the amplitudes (ampl) calculated based on equation (2) for the angular intra prediction modes as determined from equation (1).

Figure 10:
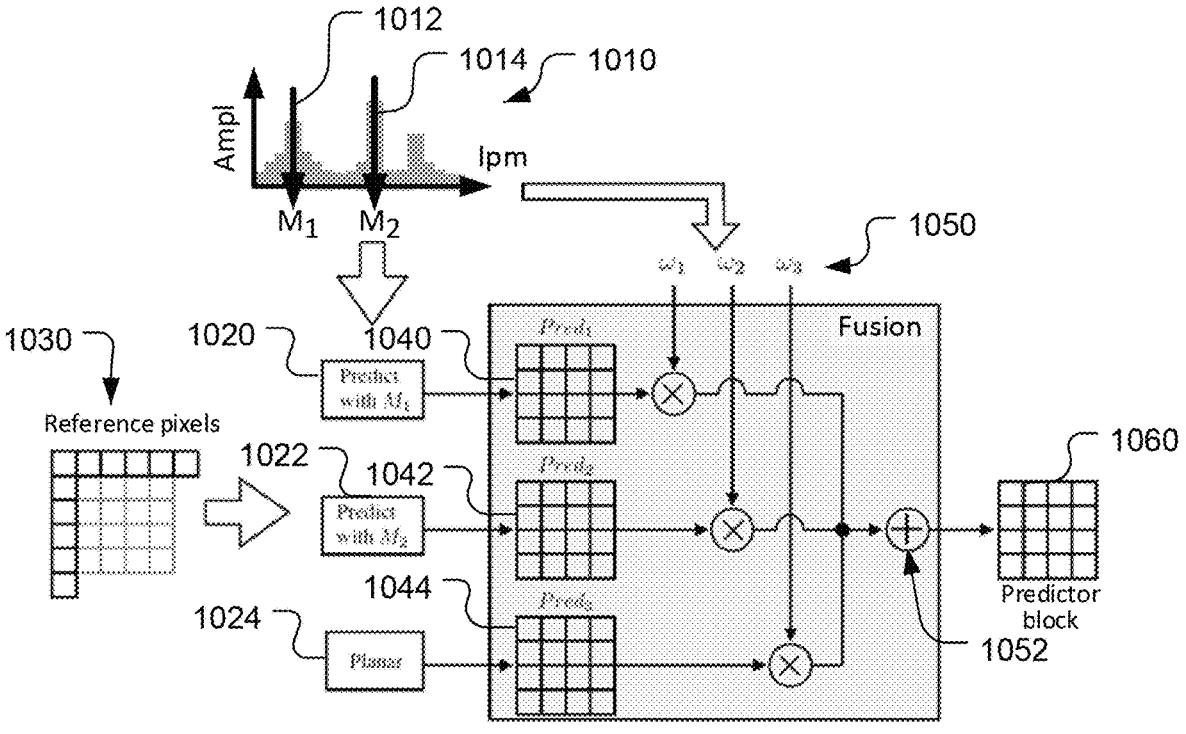
FIG. 10 illustrates an example of the blending process, where two intra modes (M1 and M2) and the planar mode are selected according to the indices with two tallest bars of histogram bars.

Once HoG is computed, the indices with two tallest histogram bars are selected as the two implicitly derived intra prediction modes for the block and are further combined with the Planar mode as the prediction of DIMD mode. The prediction fusion is applied as a weighted average of the above three predictors. To this aim, the weight of planar is fixed to 21/64 (~1/3). The remaining weight of 43/64 (~2/3) is then shared between the two HoG IPMs, proportionally to the amplitude of their HoG bars. FIG. 10 illustrates an example of the blending process. As shown in FIG. 10, two intra modes (M1 1012 and M2 1014) are selected according to the indices with two tallest bars of histogram bars 1010. The three predictors (1040, 1042 and 1044) are used to form the blended prediction. The three predictors correspond to applying the M1, M2 and planar intra modes (1020, 1022 and 1024 respectively) to the reference pixels 1030 to form the respective predictors. The three predictors are weighted by respective weighting factors ($\omega_1$, $\omega_2$ and $\omega_3$) 1050. The weighted predictors are summed using adder 1052 to generated the blended predictor 1060.

Besides, the two implicitly derived intra modes are included into the MPM list so that the DIMD process is performed before the MPM list is constructed. The primary derived intra mode of a DIMD block is stored with a block and is used for MPM list construction of the neighbouring blocks.

As mentioned earlier, DIMD is a useful coding tool to improve coding efficiency. In the present invention, methods to improve the DIMD prediction accuracy or coding performance are disclosed.

In one embodiment, the final intra prediction of the current block is produced by combining two or more intra predictions. The two or more intra predictions can be from intra angular prediction, intra DC prediction, intra planar prediction, or other intra prediction tools. In one embodiment, one of the "two or more intra predictions" (denoted as P1) can be an intra angular mode, which is implicitly derived by the gradients of neighbouring reconstructed samples (e.g., by DIMD) and has the highest gradient histogram bar. Another of "two or more intra predictions" (denoted as P2) can be implicitly derived by template matching (e.g., by TIMD), most frequently selected intra prediction mode of neighbouring 4×4 blocks, the selected intra mode after excluding high texture areas, explicitly signalled angular mode, or explicitly signalled and derived from one of MPMs. In another embodiment, P1 of the "two or more intra predictions" can be an intra angular mode, which is implicitly derived by the gradients of neighbouring reconstructed samples (e.g., by DIMD) and the intra mode angle is greater than or equal to the diagonal intra angle (e.g., mode 34 in 67 intra mode angles, mode 66 in 131 intra mode angles). P2 of the "more than intra predictions" can be implicitly derived by DIMD and the intra mode angle is less than the diagonal intra angle. In still another embodiment, P1 of the "two or more intra predictions" can be an intra angular mode, which is implicitly derived by DIMD. P2 of the "two or more intra predictions" can be implicitly derived from neighbouring blocks.

Figure 11A:
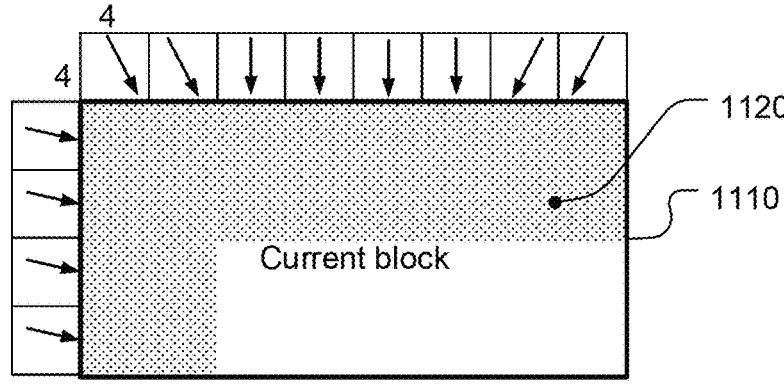
FIG. 11A illustrates an example of the P2 predictor derivation, where the P2 predictor for the area of the current block indicated by slant-line filled area is derived depending on the intra prediction mode of the neighbouring 4×4 blocks.

FIG. 11A illustrates an example of P2 predictor derivation, where the P2 predictor for the area 1120 (shown as slant-line filled area) of the current block 1110 is derived depending on the intra prediction mode of the neighbouring 4×4 blocks (shown as squares, where the arrows correspond to individual intra prediction modes for the neighbouring 4×4 blocks).

In another embodiment, P1 of the "two or more intra predictions" can be an intra angular mode implicitly derived by DIMD, and P2 of the "two or more intra predictions" can be the planar prediction referring to any smooth intra prediction method utilizing multiple reference samples at corners of the current block, such as the planar prediction as defined in HEVC/VVC, other modified or altered forms of planar prediction.

The final intra prediction of the current block could be produced by $$weight1 \times P1 + weight2 \times P2,$$

$$(P1 + P2 + 1) >> 1,$$

or $$\text{Max}(P1, P2) = (P1 + P2 + \text{abs}(P1 - P2)) >> 1.$$

Figure 11B:
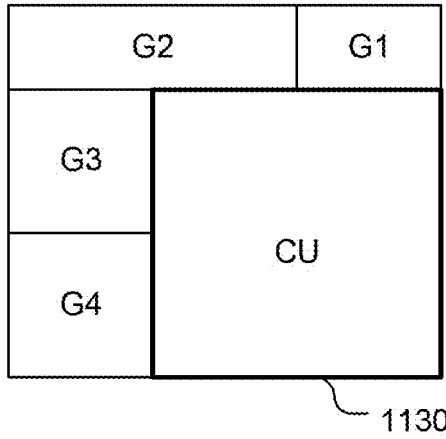
FIG. 11B illustrates another example incorporating an embodiment of the present invention, where the neighbouring window positions of the current block are partitioned into multiple groups (e.g., G1, G2, G3, and G4).

FIG. 11B illustrates another example incorporating an embodiment of the present invention, where the neighbouring window positions of the current block 1130 are partitioned into multiple groups (e.g., G1, G2, G3, and G4). Each group will select an intra angular mode, and the final intra prediction is the fusion (i.e., blending) of these selected intra angular predictions with weights.

Figure 11C:
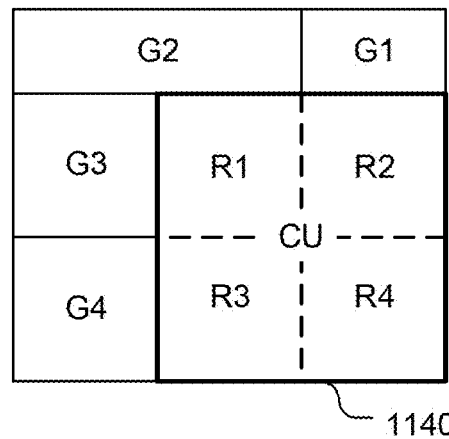
FIG. 11C illustrates another example incorporating an embodiment of the present invention, where the final intra prediction is partitioned into multiple regions and the intra prediction of each region is dependent on the neighbouring window positions.

FIG. 11C illustrates another example incorporating an embodiment of the present invention, where the final intra prediction is partitioned into multiple regions and the intra prediction of each region is dependent on the neighbouring window positions. For example, the intra prediction of R1 region is fused by the derived intra predictions from G2 and G3, the intra prediction of R2 region is fused by the derived intra predictions from G1 and G3, the intra prediction of R3 region is fused by the derived intra predictions from G2 and G4, and/or the intra prediction of R4 region is fused by the derived intra predictions from G1 and G4.

In another embodiment, when the gradient magnitudes after applying Sobel filter are less than a threshold, all derived DIMD modes are set as Planar mode, or the current prediction is set as planar prediction. In one embodiment, the threshold is allowed to vary with the block size. In still another embodiment, when the gradient magnitudes after applying Sobel filter are greater than a threshold or the gradient magnitude of the first DIMD mode after applying Sobel filter is greater than a threshold (which varies with block size), the current intra prediction is set as the prediction from first DIMD mode (i.e., without blending with planar prediction). In one embodiment, the threshold is allowed to vary with the block size.

Figure 12:
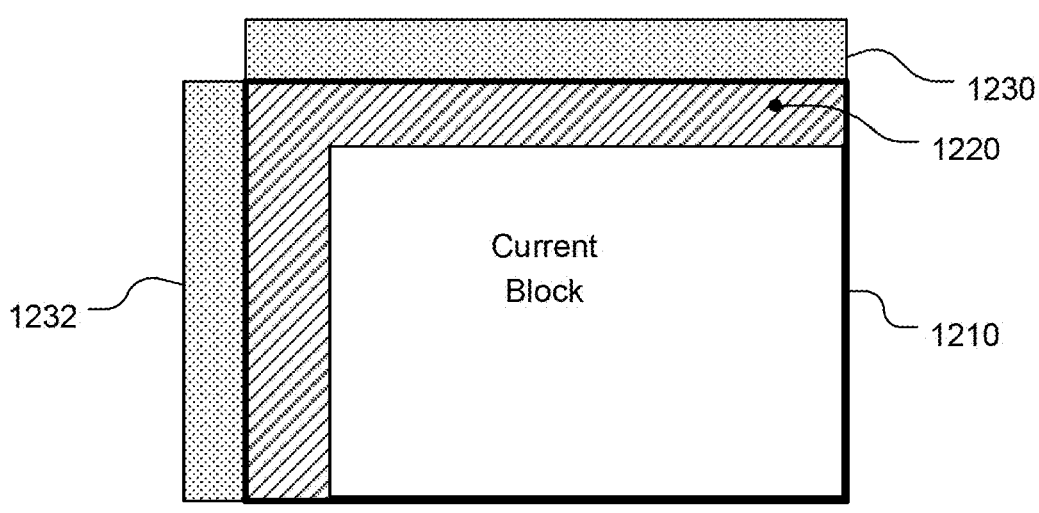
FIG. 12 illustrates an example where the predicted samples (corresponding to a candidate intra angular mode prediction) in the top and left boundary areas within the current block are indicated by slant lines.

In another embodiment, in the DIMD process, the boundary smoothness between the candidate intra angular mode prediction and the neighbouring reconstructed samples are further considered in deriving the final intra angular mode prediction. For example, the SAD between the top/left prediction samples and the respective neighbouring samples of each of the intra mode candidates is considered in searching for the final intra angular mode prediction as shown in FIG. 12. In FIG. 12, the predicted samples (corresponding to a candidate intra angular mode prediction) in the top and left boundary areas 1220 within the current block are indicated by slant lines. The neighbouring reconstructed samples in the top area 1230 and the left area 1232 are shown as dot-filled areas.

In another embodiment, to improve the coding performance of DIMD, a delta angle is signalled to the decoder side. The final intra angular mode is the intra mode derived by DIMD plus the delta angle. In one embodiment, the encoder side can use the original samples to estimate the best intra angular mode. To reduce the mode signalling overhead, DIMD is applied to implicitly derive an intra angular mode, then the delta angle between the best intra angular mode and the DIMD derived intra mode is signalled to decoder side. The delta angle can contain a syntax for the magnitude of the delta angle and a syntax for the sign of the delta angle. The final intra angular mode at the decoder side is the DIMD derived intra mode plus the delta angle. Note, the required coding bins for signalling the magnitude and sign of the delta angle are less than the required coding bins for signalling final intra angular mode (e.g., the intra_luma_mpm_remainder syntax in H.266/VVC or the rem_intra_luma_pred_mode syntax in H.265/HEVC).

To simplify the DIMD process, the HoG computation is from partial selected neighbouring window positions to reduce the required computations. For one embodiment, it can choose the above-middle, above-right, left-middle, left-bottom neighbouring window positions to apply Sobel filters to build HoG. Alternatively, it can choose even or odd neighbouring window positions to apply Sobel filters to build HoG. For another embodiment, the angular mode is implicitly derived by applying Sobel filter to the above-selected window positions (e.g., the above neighbouring window positions covering 0, . . . , 2×current block width, or 0, . . . , current block width+current block height), and another angular mode is implicitly derived by applying Sobel filter to left-selected window position (e.g., the left neighbouring position covering 0, . . . , 2×current block height, or 0, . . . , current block width+current block height), then HoG computation is not required.

In another embodiment, to improve the coding performance of DIMD, DIMD prediction is applied to chroma CUs to implicitly derive intra angular modes. In one embodiment, if candidate intra chroma modes are DC, vertical, horizontal, planar, and DM, DIMD prediction is applied to derive the final intra angular mode. In another embodiment, a flag is used to indicate if DIMD is used to derive the final intra angular mode. If the flag is true, DIMD implicitly derives the final intra angular mode and excludes the DC, vertical, horizontal, planar, and DM modes in the candidate intra mode list.

In another embodiment, after deriving the intra angular mode by DIMD, it can perform a fine search around the derived intra angular mode. In one embodiment, DIMD derives the intra angular mode from modes 0 to 66. Assume the intra angular mode k is derived, the encoder side can insert more intra modes for search between (k−1) and (k+1), and signal a delta value to indicate the final intra prediction angular mode.

In another embodiment, when deriving the intra angular mode by DIMD, it can exclude or reduce the gradient of the neighbouring inter-coded positions in computing the gradient histogram or increase the cost between the prediction and reconstruction of inter-coded template.

To reduce the required comparisons in DIMD, the candidate intra angular modes in DIMD can depend on the block size or the prediction mode of neighbouring blocks. In one embodiment, the number of candidate intra angular modes in DIMD for small CUs (e.g., CU width+height or CU area less than a threshold) is less than that in DIMD for large CUs. For example, the number of intra angular mode candidates in DIMD for small CUs is 34, the number of intra angular mode candidates in DIMD for large CUs is 67. In still another embodiment, the candidate intra angular modes in DIMD can be further constrained or reduced to a predefined range. For example, if the current intra angular modes can support up to 67 modes (i.e., 0, 1, 2, 3, . . . , 66), it can constrain the candidate intra angular modes in DIMD to a subset of these 67 modes (i.e., the number of candidates<67). The constrained candidates can be {0, 1, 2, 4, 6, 8, . . . , 66}, {0, 1, 3, 5, 7, 9, . . . , 65}, {0, 1, 2, 3, 4, 5, . . . , 34}, or {34, 35, 36, 37, 38, . . . , 66}. This constrained condition (e.g. which of the subsets being selected) can be signalled in PPS (Picture Parameter Set), SPS (Sequence Parameter Set), picture header, slice header, CTU-level syntax, or implicitly derived depending on other syntaxes, or always applied. For still another example, if the constrained condition is signalled, the CUs coded with DIMD only use less candidate intra angular modes to derive the final intra angular mode. In another embodiment, the candidate intra angular modes in DIMD can be further constrained by the prediction mode of neighbouring blocks. For example, if the top neighbouring CUs are inter-coded in the skip mode, the intra angular modes greater than the diagonal intra angular mode (e.g., mode 66 in 131 intra angular modes, mode 34 in 67 intra angular modes, mode 18 in 34 intra angular modes) are excluded from the candidate intra angular modes in DIMD. If the left neighbouring CUs are inter-coded in the skip mode, the intra angular modes less than the diagonal intra angular mode (e.g., mode 66 in 131 intra angular modes, mode 34 in 67 intra angular modes, mode 18 in 34 intra angular modes) are excluded from the candidate intra angular modes in DIMD.

The number of neighbouring lines to compute HoG in DIMD can be signalled in PPS, SPS, picture header, slice header, CTU-level syntax, or implicitly derived depending on other syntax(es). For example, it can use more neighbouring lines to compute HoG in DIMD when the current block size is less than or greater than a threshold.

Figure 13:
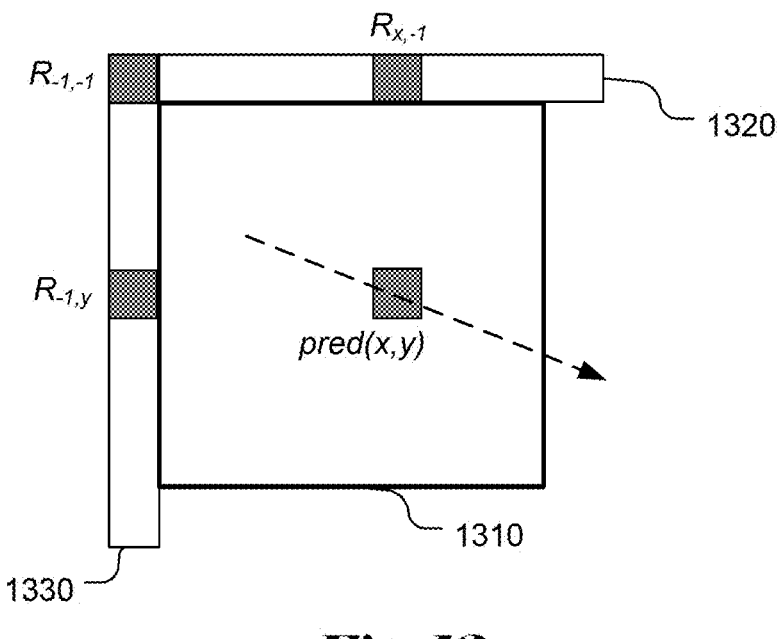
FIG. 13 illustrates an example, where if the current intra prediction is from the left-side neighbouring reconstructed samples, the current prediction at (x, y) is further refined by the gradient between the above-left corner sample (e.g., $R_{-1, -1}$) and the current left neighbouring sample (e.g., $R_{-1, y}$).

After producing an intra angular mode prediction by DIMD, the intra prediction is further refined by the gradient of neighbouring reconstructed samples. In one embodiment, the intra prediction is refined by the gradient of neighbouring reconstructed samples. For example, as shown in FIG. 13 for a current block 1310, if the current intra prediction is from the left-side neighbouring reconstructed samples 1330, the current prediction at (x, y) is further refined by the gradient between the above-left corner sample (e.g., $R_{-1, -1}$) and the current left neighbouring sample (e.g., $R_{-1, y}$). Then, the refined prediction at (x, y) is $(w_1 \times (R_{x, -1} + (R_{-1, -1} - R_{-1, y})) + w_2 \times \text{pred}(x, y))/(w_1 + w_2)$. For still another example, if the current intra prediction is from the above-side neighbouring reconstructed samples 1320, the current prediction at (x, y) is further refined by the gradient between the above-left corner sample (e.g., $R_{-1, -1}$) and the current above neighbouring sample (e.g., $R_{x, -1}$). Then, the refined prediction at (x, y) is $(w_1 \times (R_{-1, y} + (R_{-1, -1} - R_{x, -1})) + w_2 \times \text{pred}(x, y))/(w_1 + w_2)$.

When the current block is a narrow block (e.g., width<<height) or a wide block (e.g., width>>height), the horizontal and vertical Sobel filters are replaced by the following two matrixes respectively to map to support wide-angle intra modes.

$$\text{Vertical Sobel filter} = \begin{bmatrix} 0 & -1 & -2 \\ 1 & 0 & -1 \\ 2 & 1 & 0 \end{bmatrix},$$

$$\text{Horizontal Sobel filter} = \begin{bmatrix} -2 & -1 & 0 \\ -1 & 0 & 1 \\ 0 & 1 & 2 \end{bmatrix},$$

or $$\text{Vertical Sobel filter} = \begin{bmatrix} -2 & -1 & 0 \\ -1 & 0 & 1 \\ 0 & 1 & 2 \end{bmatrix},$$

-continued $$\text{Horizontal Sobel filter} = \begin{bmatrix} 0 & -1 & -2 \\ 1 & 0 & -1 \\ 2 & 1 & 0 \end{bmatrix}.$$

If the mapped intra angular mode is greater than 135 (e.g., mode 66) or less than −45 (e.g., mode 2), the mapped intra angular mode is converted to the intra mode at another side. For example, if the mapped intra angular mode is greater than mode 66, then the converted intra prediction mode is equal to (the mapped intra angular mode−65). For another example, if the mapped intra angular mode is less than mode 2, then the converted intra prediction mode is equal to (the mapped intra angular mode+67).

Figure 1B:
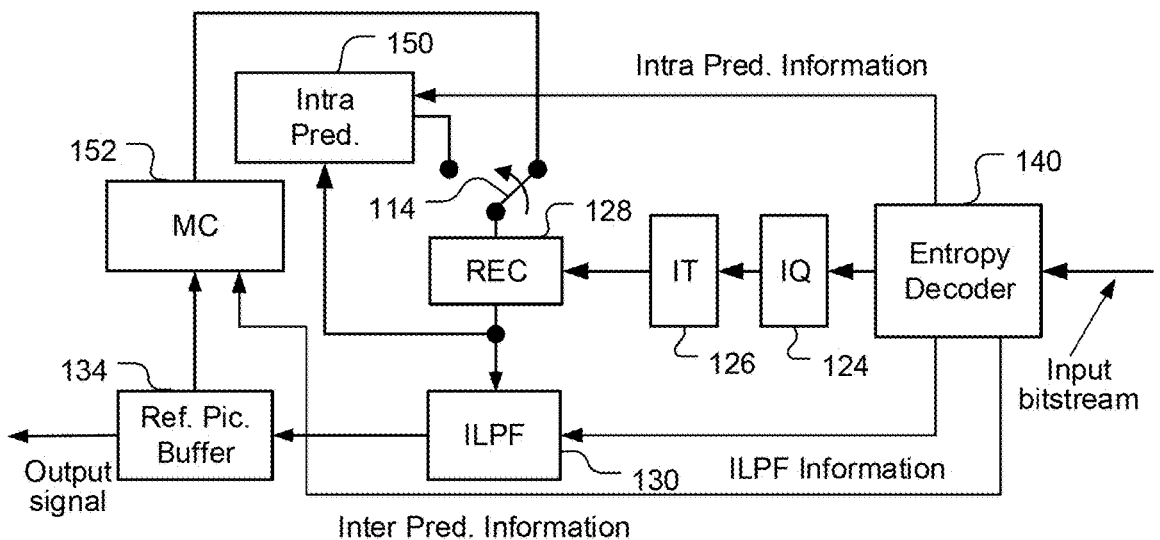
FIG. 1B illustrates a corresponding decoder for the encoder in FIG. 1A.

Any of the foregoing proposed improved DIMD methods can be implemented in encoders and/or decoders. For example, any of the proposed improved DIMD methods can be implemented in an intra prediction module (e.g. Intra pred. 110 in FIG. 1A) of an encoder, and/or an intra prediction module (e.g. Intra pred. 150 in FIG. 1B) of a decoder. However, the encoder or the decoder may also use additional processing units to implement the required processing. Alternatively, any of the proposed methods can be implemented as a circuit coupled to the inter/intra/prediction module of the encoder and/or the inter/intra/prediction module of the decoder, so as to provide the information needed by the inter/intra/prediction module.

Figure 14:
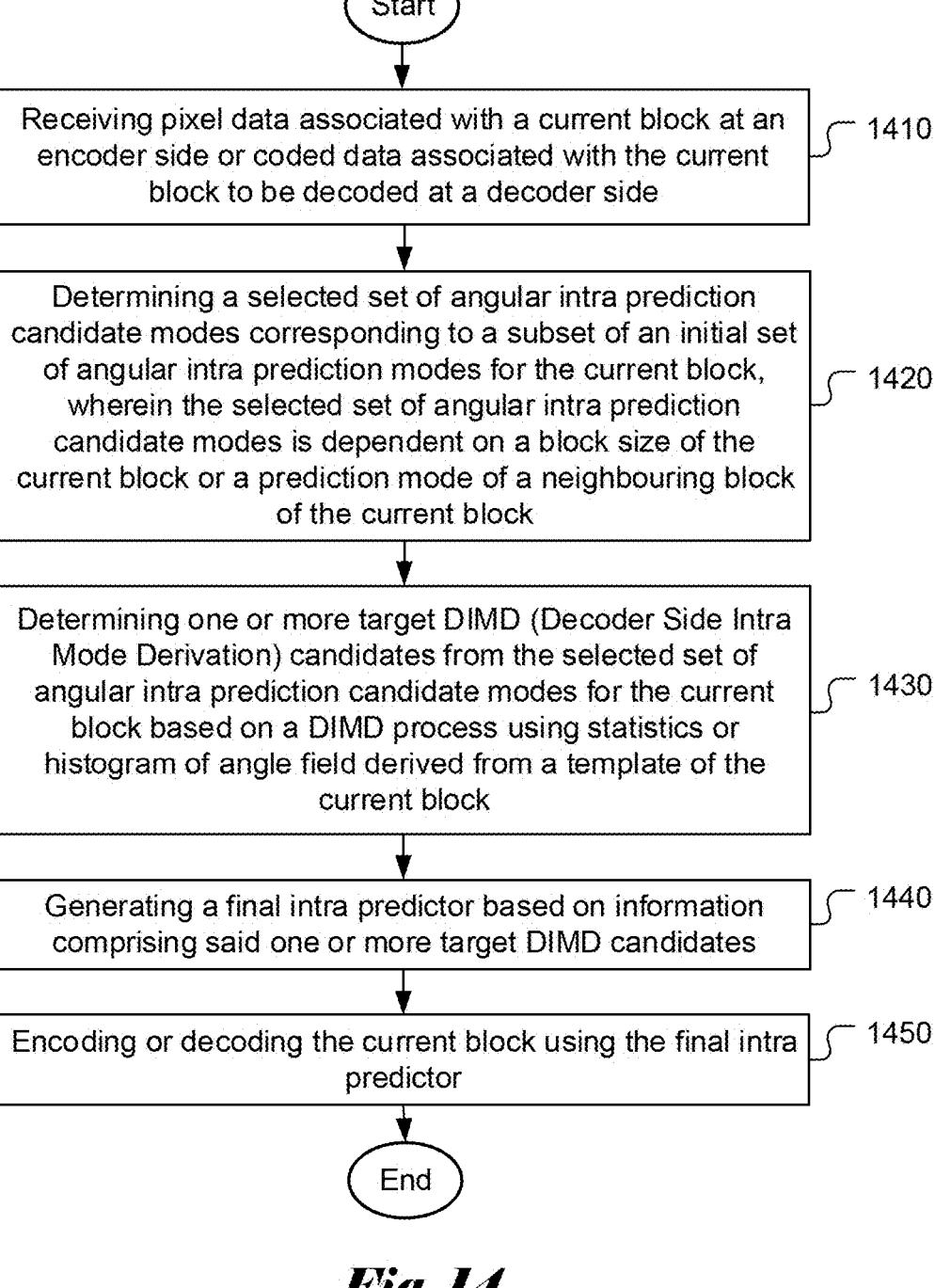
FIG. 14 illustrates a flowchart of an exemplary video coding system that derives DIMD (Decoder Side Intra Mode Derivation) candidates using a subset of angular intra prediction modes according to an embodiment of the present invention.

FIG. 14 illustrates a flowchart of an exemplary video coding system that derives DIMD (Decoder Side Intra Mode Derivation) candidates using a subset of angular intra prediction modes according to an embodiment of the present invention. According to this method, pixel data associated with a current block at an encoder side or coded data associated with the current block to be decoded at a decoder side are received in step 1410. A selected set of angular intra prediction candidate modes corresponding to a subset of an initial set of angular intra prediction modes is determined for the current block in step 1420, wherein the selected set of angular intra prediction candidate modes is dependent on a block size of the current block or a prediction mode of a neighbouring block of the current block. One or more target DIMD (Decoder Side Intra Mode Derivation) candidates are determined from the selected set of angular intra prediction candidate modes for the current block based on a DIMD process using statistics or histogram of angle field derived from a template of the current block in step 1430. A final intra predictor is generated based on information comprising said one or more target DIMD candidates in step 1440. The current block is encoded or decoded using the final intra predictor in step 1450.

Figure 15:
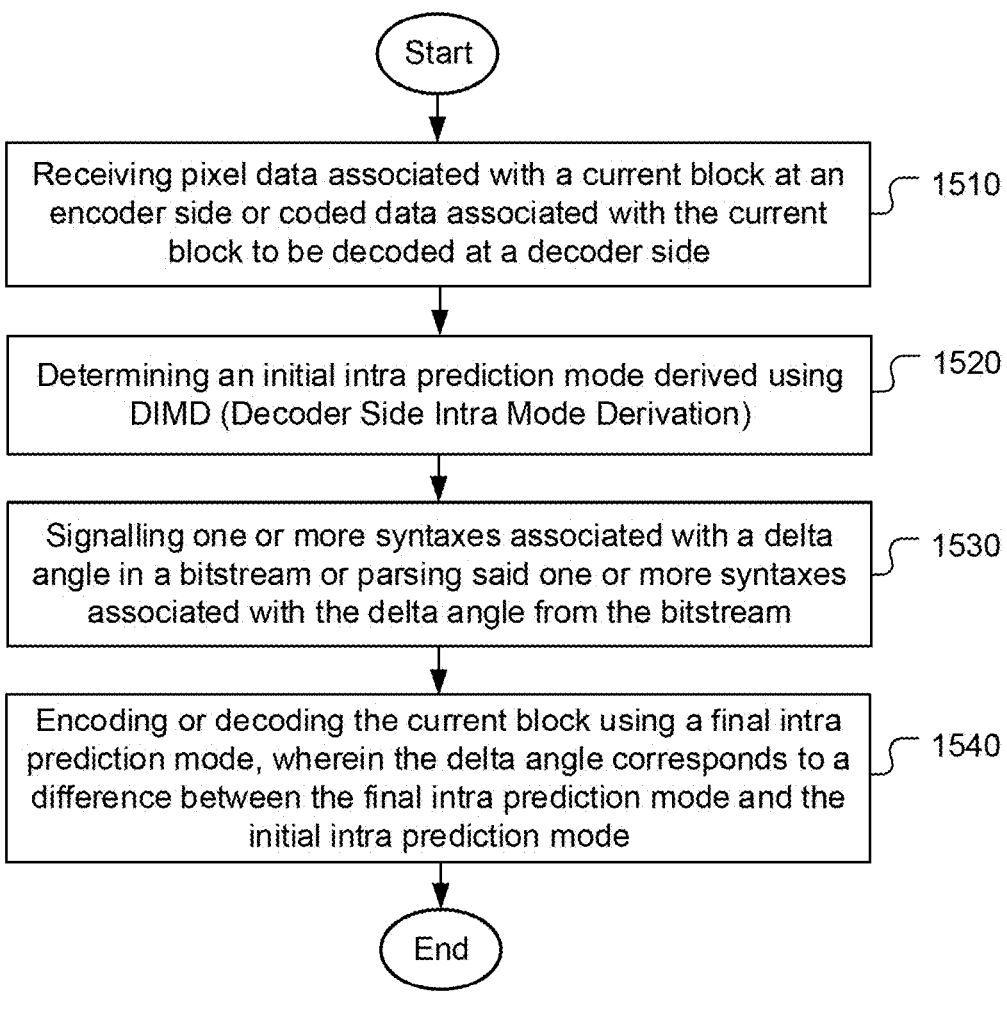
FIG. 15 illustrates a flowchart of an exemplary video coding system that derives DIMD (Decoder Side Intra Mode Derivation) candidates according to an embodiment of the present invention, where a delta angle between a final intra prediction mode and a DIMD derived mode is signalled or parsed.

FIG. 15 illustrates a flowchart of an exemplary video coding system that derives DIMD (Decoder Side Intra Mode Derivation) candidates according to an embodiment of the present invention, where a delta angle between a final intra prediction mode and a DIMD derived mode is signalled or parsed. According to this method, pixel data associated with a current block at an encoder side or coded data associated with the current block to be decoded at a decoder side are received in step 1510. An initial intra prediction mode derived using DIMD (Decoder Side Intra Mode Derivation) is determined in step 1520. One or more syntaxes associated with a delta angle are signalled or parsed from a bitstream in step 1530. The current block is encoded or decoded using a final intra prediction mode in step 1540, wherein the delta angle corresponds to a difference between the final intra prediction mode and the initial intra prediction mode.

Figure 16:
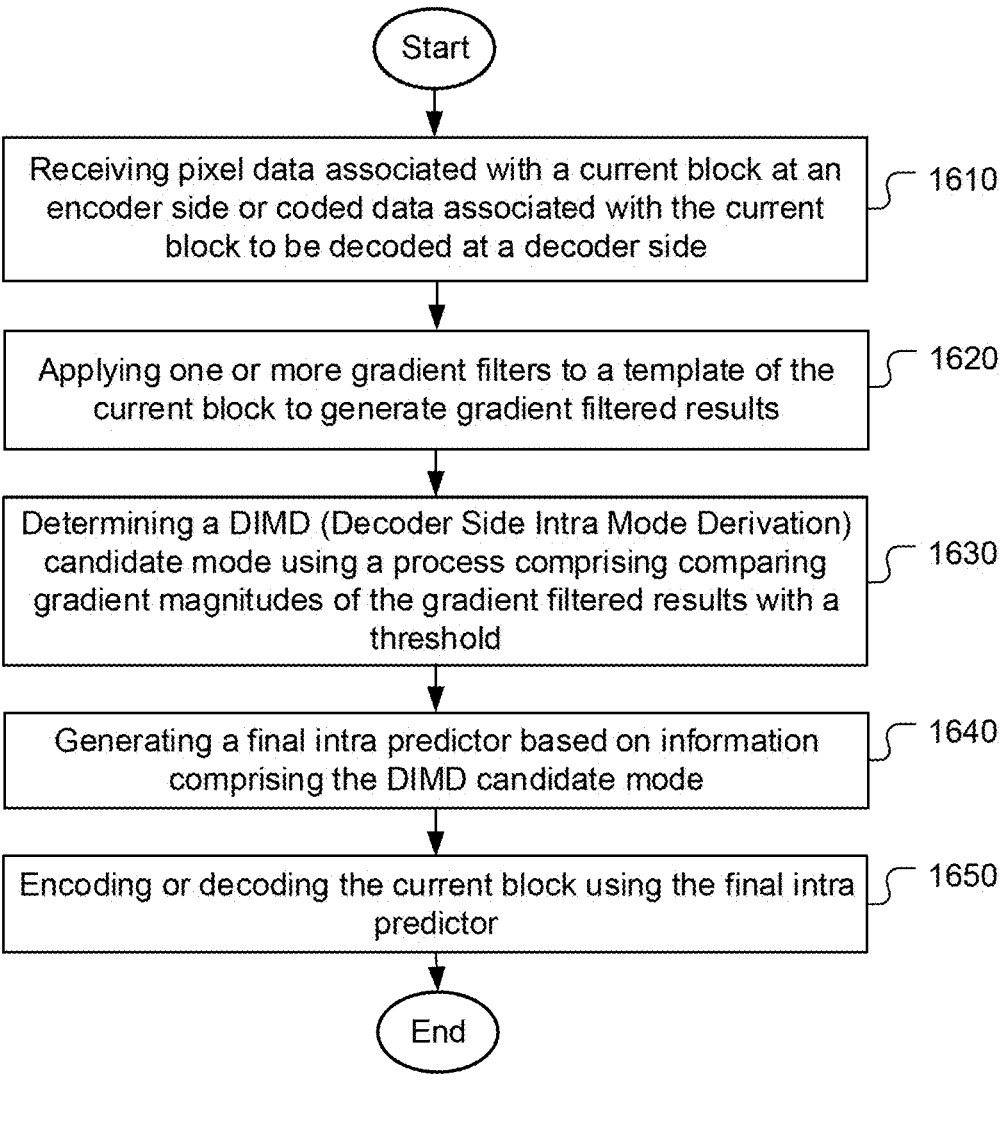
FIG. 16 illustrates a flowchart of an exemplary video coding system that derives DIMD (Decoder Side Intra Mode Derivation) candidates using a process comprising comparing gradient magnitudes of the gradient filtered results with a threshold according to an embodiment of the present invention.

FIG. 16 illustrates a flowchart of an exemplary video coding system that derives DIMD (Decoder Side Intra Mode Derivation) candidates using a process comprising comparing gradient magnitudes of the gradient filtered results with a threshold according to an embodiment of the present invention. According to this method, pixel data associated with a current block at an encoder side or coded data associated with the current block to be decoded at a decoder side are received in step 1610. One or more gradient filters are applied to a template of the current block to generate gradient filtered results in step 1620. A DIMD (Decoder Side Intra Mode Derivation) candidate mode is determined by comparing gradient magnitudes of the gradient filtered results with a threshold in step 1630. A final intra predictor is generated based on information comprising the DIMD candidate mode in step 1640. The current block is encoded or decoded using the final intra predictor in step 1650.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:

receiving pixel data associated with a current block at an encoder side or coded data associated with the current block to be decoded at a decoder side;

determining a selected set of angular intra prediction candidate modes corresponding to a subset of an initial set of angular intra prediction modes for the current block, wherein the selected set of angular intra prediction candidate modes is dependent on a block size of the current block or a prediction mode of a neighbouring block of the current block;

determining one or more target DIMD (Decoder Side Intra Mode Derivation) candidates from the selected set of angular intra prediction candidate modes for the current block based on a DIMD process using statistics or histogram of angle field derived from a template of the current block;

generating a final intra predictor based on information comprising said one or more target DIMD candidates; and encoding or decoding the current block using the final intra predictor.

2. The method of claim 1, wherein a number of angular intra prediction candidate modes in the selected set of angular intra prediction candidate modes is determined to be lesser for a smaller block size of the current block.

3. The method of claim 1, wherein the block size of the current block corresponds to a sum of block width and block height of the current block.

4. The method of claim 1, wherein the selected set of angular intra prediction candidate modes corresponds to a predefined set of angular intra prediction modes for the current block.

5. The method of claim 1, wherein the selected set of angular intra prediction candidate modes corresponds to a constrained candidate set.

6. The method of claim 5, wherein the constrained candidate set corresponds to a member in a group comprising even-numbered intra prediction modes, odd-numbered intra prediction modes, first-half set of the initial set of angular intra prediction modes, or last-half set of the initial set of angular intra prediction modes.

7. The method of claim 6, a syntax is signalled or parsed to indicate the member in the group corresponding to the constrained candidate set for the current block.

8. The method of claim 5, wherein a syntax related to the constrained candidate set is signalled or parsed from PPS (Picture Parameter Set), SPS (Sequence Parameter Set), a picture header, a slice header, or a CTU-level syntax.

9. The method of claim 5, wherein a syntax related to the constrained candidate set is implicitly derived based on other syntax.

10. The method of claim 5, wherein the constrained candidate set is always used.

11. The method of claim 1, wherein if a top neighbouring CU is inter-coded in skip mode, the selected set of angular intra prediction candidate modes excludes angular intra prediction candidate modes with mode numbers greater than a diagonal intra angular mode.

12. The method of claim 1, wherein if a left neighbouring CU is inter-coded in skip mode, the selected set of angular intra prediction candidate modes excludes angular intra prediction candidate modes with mode numbers less than a diagonal intra angular mode.

13. An apparatus for video coding, the apparatus comprising one or more electronics or processors arranged to:

receive pixel data associated with a current block at an encoder side or coded data associated with the current block to be decoded at a decoder side;

determine a selected set of angular intra prediction candidate modes corresponding to a subset of an initial set of angular intra prediction modes for the current block, wherein the selected set of angular intra prediction candidate modes is dependent on a block size of the current block or a prediction mode of a neighbouring block of the current block;

determine one or more target DIMD (Decoder Side Intra Mode Derivation) candidates from the selected set of angular intra prediction candidate modes for the current block based on a DIMD process using statistics or histogram of angle field derived from a template of the current block;

generate a final intra predictor based on information comprising said one or more target DIMD candidates; and encode or decode the current block using the final intra predictor.

* * * * *